April 4, 1967 A. NEUMEIER 3,312,810
AUTOMATIC STUD FEEDER

Filed March 17, 1964 6 Sheets-Sheet 5

ALBERT NEUMEIER
INVENTOR
BY
BUCKHORN, BLORE, KLARQUIST & SPARKMAN
ATTORNEYS

ALBERT NEUMEIER
INVENTOR
BY
BUCKHORN, BLORE, KLARQUIST & SPARKMAN
ATTORNEYS

United States Patent Office 3,312,810
Patented Apr. 4, 1967

3,312,810
AUTOMATIC STUD FEEDER
Albert Neumeier, Milwaukie, Oreg., assignor to Omark Industries, Inc., Portland, Oreg., a corporation of Oregon
Filed Mar. 17, 1964, Ser. No. 352,491
15 Claims. (Cl. 219—98)

This invention relates to apparatus for feeding and welding studs, and more particularly to a stud welder having selective manual and automatic feeds of studs.

Some prior art stud welders have been provided with feed devices for feeding studs into welding positions for engagement by electrode collets thereof so that the studs do not have to be loaded manually into the collets. Such feed devices, however, have been complex and subject to jamming, do not always move the collets over the studs and also have been operable only automatically, while for some uses it is preferable to actuate the feed devices manually. It would be desirable to provide a stud welder which always moves its collet over the stud and has a feed device which is simple, does not jam, and is selectively operable either automatically or manually.

An object of the invention is to provide new and improved apparatus for feeding and welding studs.

Another object of the invention is to provide a stud welder having selective manual and automatic feeds of the studs.

A further object of the invention is to provide a stud welder having a feed device which is simple and does not jam.

Yet another object of the invention is to provide a stud welder which has a collet positively moved over a stud in a welding position while being only spring urged during the welding operation proper.

A still further object of the invention is to provide a feed device for a stud welder operable either manually or automatically.

The invention provides a feed device for a stud welder having feed means for moving a stud to be welded into a welding position aligned with an electrode collet movable from a retracted position aligned with and spaced back away from a stud in the welding position together with an actuator for driving the feed means and operable only when the collet is away from the welding position. Preferably the actuator is operated during the initial portion of movement of the collet from its retracted position to feed a stud to the welding position before the collet is moved sufficiently forwardly to engage the stud. The actuator preferably is adjustable selectively between a first condition in which movement of the collet drives the feed means automatically and a second condition in which the feed means is actuated only manually.

In an apparatus for feeding and welding studs forming one embodiment of the invention, a housing carries an electrode collet slidably relatively thereto with a spring urging the collet forwardly relatively to the housing and a member limiting movement of the collet against the spring to positively move the collet over a stud if the collet catches on the stud while being urged thereover by the spring. A tape guideway is mounted on a spring pressed plunger carried by the housing and is normally spaced forwardly of the forward end of the housing. The guideway has an opening aligned with the housing and is adapted to engage a workpiece and guide a tape carrying studs through the opening to position the studs seriatim in a welding position in the opening in the guideway. A cam track is carried by the housing, and is selectively placed in either an automatic feed condition or a manual feed condition. When in the automatic feed condition, a cam portion of the cam track is operable by the initial portion of the forward movement of the housing to drive pawl means on the tape guideway to move the pawl means in a direction engaging a stud carried by the tape and moving the tape along the guideway to position a stud in the welding position, and then, during a subsequent portion of the forward movement of the housing, a second portion of the cam track is effective to move the pawl means to its inoperative position out of engagement with the studs. When the cam track is in its manual condition, a spring urges the cam track to a position in which only its cam portion engages the pawl means during movement of the barrel relative to the tape guideway and the cam portion is in a dwell position at this time. When a manual handle on the cam track is utilized to move the cam track against the spring and then released, the cam track moves the pawl means through a cycle including a feed stroke and a retracting stroke.

A complete understanding of the invention may be obtained from the following detailed description of an apparatus for feeding and welding studs forming a specific embodiment thereof, when read in conjunction with the appended drawings, in which.

Figures 1, 2, 3:
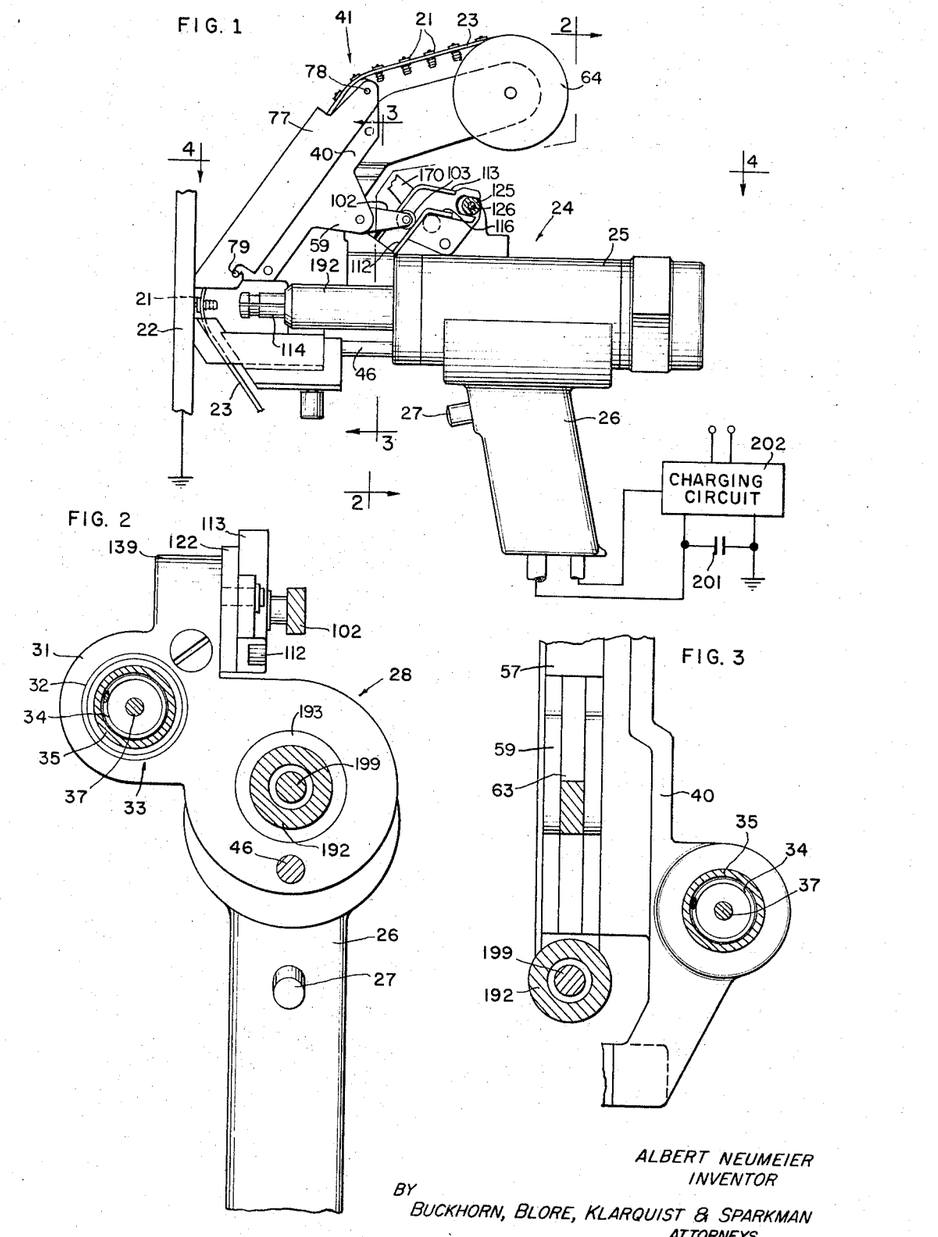
FIG. 1 is a side elevation view of an apparatus for feeding and welding studs forming one embodiment of the invention in position preparatory to welding a stud to a workpiece.
FIG. 2 is an enlarged, vertical sectional view taken substantially along line 2—2 of FIG. 1.
FIG. 3 is an enlarged, vertical sectional view taken substantially along line 3—3 of FIG. 1.

Referring now in detail to the drawings, there is shown therein an apparatus for feeding and welding seriatim studs 21 to a workpiece 22. The studs are carried by a tape 23. The apparatus includes a stud welding gun 24 including a barrel or housing 25 (FIG. 1) and a handle 26 rigid with the housing for carrying and manipulating the gun. The handle 26 carries a welding current controlling switch 27. An attachment frame 28 has a flanged annular insert 29 fitting into and locked rigidly in end portion 30 (FIG. 6) of the housing by set screws (not shown).

Figure 4:
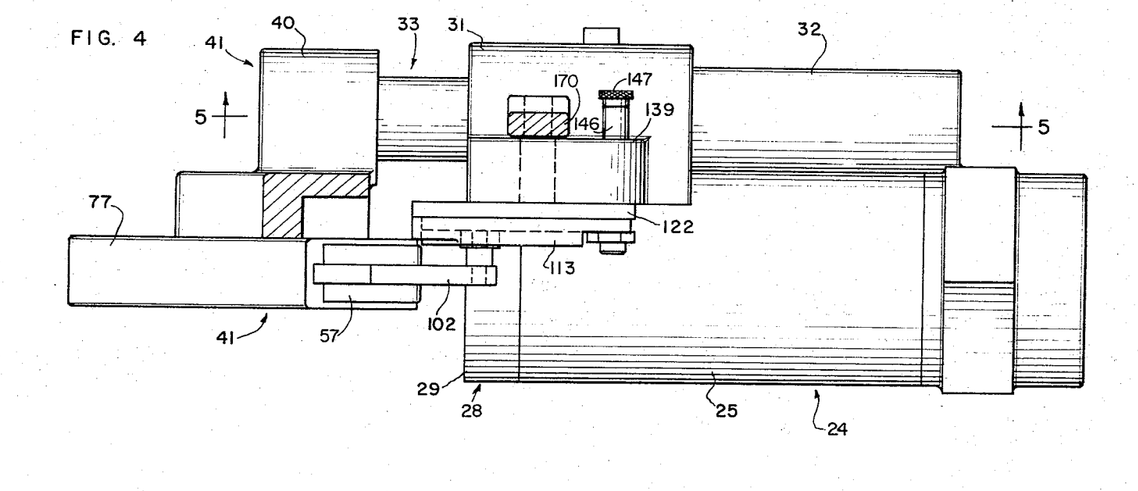
FIG. 4 is an enlarged, fragmentary, horizontal sectional view taken substantially along line 4—4 of FIG. 1.
Figure 5:
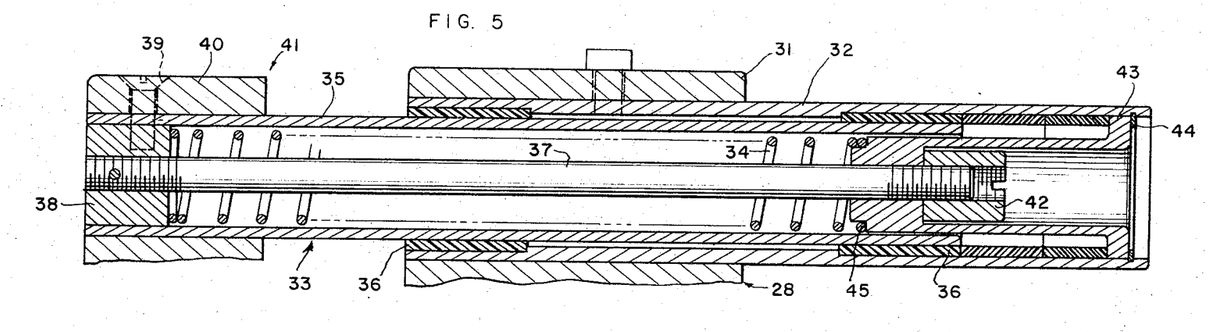
FIG. 5 is an enlarged, horizontal sectional view taken along line 5—5 of FIG. 4.

The frame 28 also has a ring 31 (FIGS. 2, 4 and 5) carrying rigidly in a position parallel to the barrel a cylindrical sleeve 32 mounting a plunger or guide pin 33 urged forwardly relative to the barrel by a compression spring 34 (FIG. 5) in the sleeve. The plunger 33 (FIG. 5) includes a tube 35 slidable in polytetrafluoroethylene bushings 36 in the sleeve 32, and has a rod 37 screwed into and pinned to an annular stop 38 fixed in the forward end of the tube 35 by screw 39. The screw 39 also locks the forward end of the tube 35 and the stop 38 to a plate or carrying bracket 40 of a magazine or stud feeding device 41. A slotted nut 42 in a counterbored, flanged, depth controlling bushing 43 is turnable by a screwdriver (not shown) on the threaded end of the rod 37 to adjust the normal or start position of the bracket 40 relative to the frame 28. The bushing 43 is retained in the sleeve 32 by a split retainer ring 44, and the flange of the bushing 43 abuts one of the bushings 36 so that the bushing 43 is held against movement to the left, as viewed in FIG. 5, along the sleeve 32. The spring 34 seats between the stop 38 and an annular shoulder 45 of the bushing 43, and urges the plunger 33 to the left relative to the bushing 43 and sleeve 32. A keying guide rod 46 (FIG. 6) is carried by the frame 28 in a position parallel to the plunger 33.

Figures 6, 16:
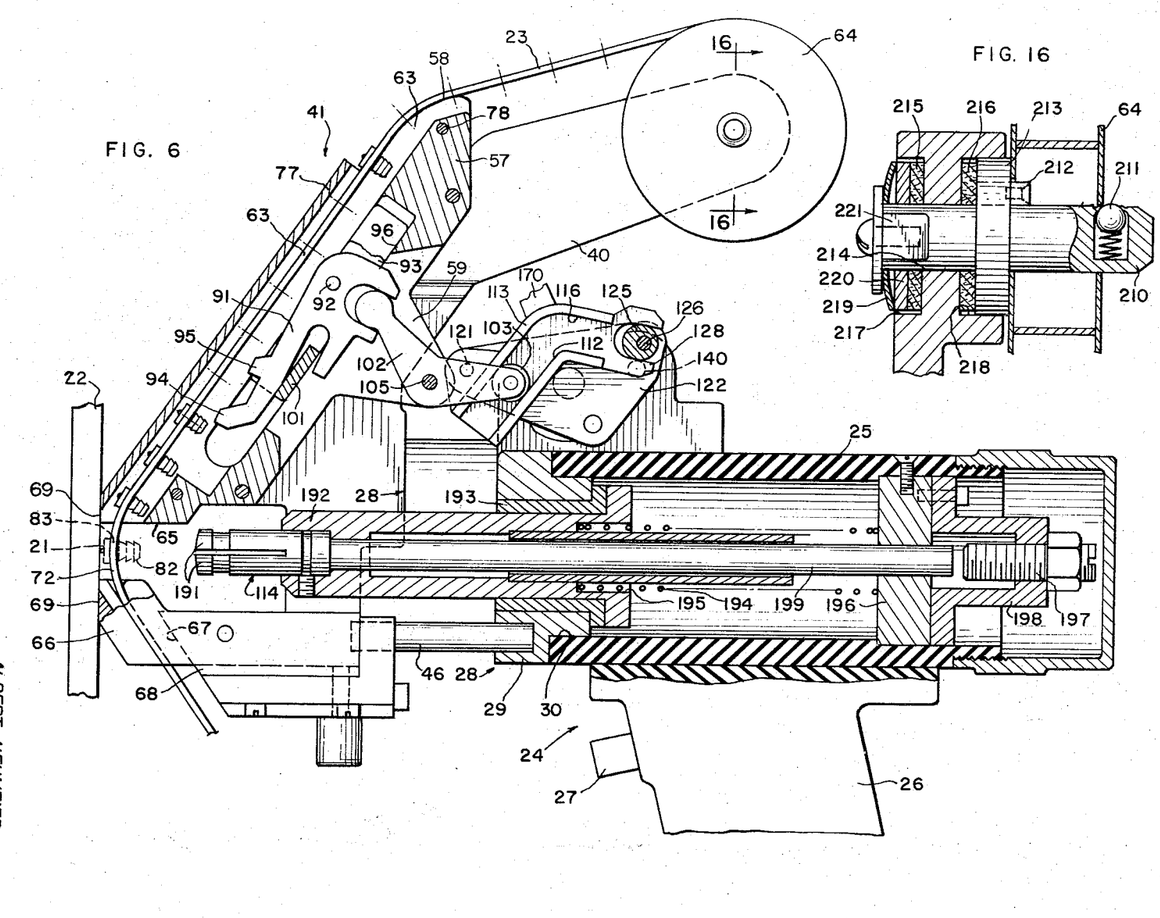
FIGS. 6 and 7 are enlarged, fragmentary, vertical sectional views showing the apparatus of FIG. 1 in different conditions of automatically feeding studs during a welding cycle.
FIG. 16 is an enlarged, fragmentary, vertical sectional view of a portion of the apparatus of FIG. 1.
Figure 8:
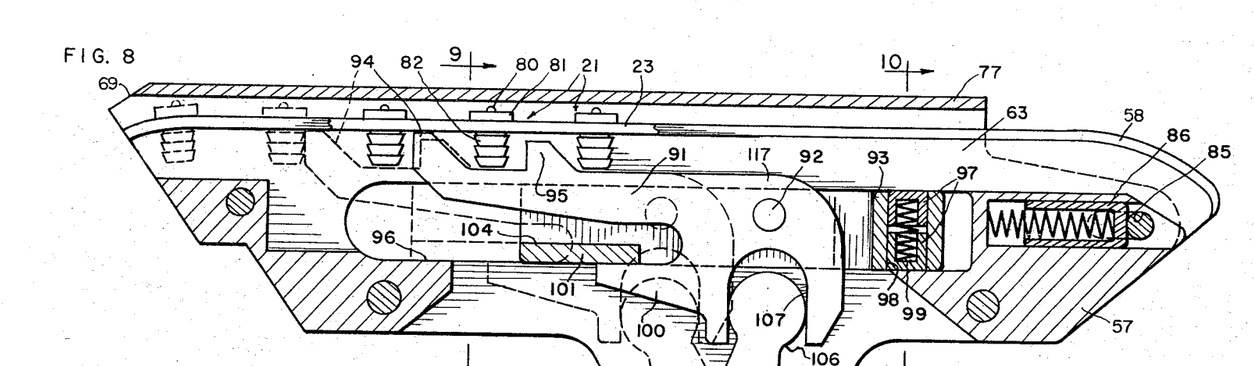
FIG. 8 is an enlarged, vertical sectional view of a stud-feeding device of the apparatus of FIG. 1.
Figure 9:
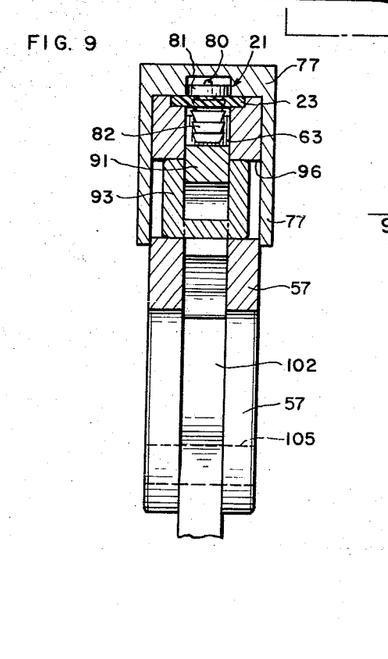
FIGS. 9 and 10 are enlarged, vertical sectional views taken substantially along lines 9—9 and 10—10, respectively, of FIG. 8.

The magazine or stud feeding device 41 is carried by the plunger 33 and has a bored portion slidable on the rod 46. The device 41 includes the bracket 40, to which is rigidly secured a slotted plate 57 having a fork or clevis 59 and a tape and stud guideway 63 (FIGS. 8 and 9), which is T-shaped in cross-section and fits closely on the tape and loosely relative to the studs. The guideway 63 has a curved and flared entrance portion 58 leading from a point near a reel 64, and extends to an opening 65 at the welding position. A tape guide 66 having a flared entrance portion is fixed to portion 67 of the bracket, directs the tape from the opening 65 and forms a manually operable tape shear with blade 68. The blade 68 is so located when in its retracted position as to permit studs carried by the tape to clear the blade and when actuated to shear the portions of the tape between the stud-receiving holes in the tape. The tape guide also is slotted to permit movement of studs carried by the tape therethrough. The opening 65 is positioned between work-engaging portions 69 at the ends of the guideway and tape guide. The portions 69 are adapted to engage the workpiece 22 to which the lead one of the studs 21 is to be welded. As illustrated in FIG. 6, the guideway 63 and the guide 66 are inclined oppositely toward the adjacent face of the workpiece 22, and are generally in the form of a V, so as to form a bow in the portion 72 of the tape 23 in the opening 65, and the bowed portion 72 of the tape presses any stud 21 in the opening 65 against the workpiece 22. A slotted guide and cover 77 is pivoted to the bracket 40 by pin 78 between an open position and a closed position covering the guideway 63. When in the closed position, the cover is held by a pin and slot latch 79, the pin 78 being laterally movable in slot 85 (FIG. 8) and being urged to latching position by a spring-pressed plunger 86. The tape 23 is adapted to position each stud in the welding position in which the stud is in the opening 65 and a reduced tip or projection 80 on an enlarged base 81 of the stud engages the workpiece. Each stud also has a serrated, generally cylindrical, stud body 82. The bodies 82 fit tightly in holes 83 in the tape 23, which is composed of an electrically insulating, somewhat stiff material such as, for example, polyethylene. The tape is sufficiently stiff that it can be pushed along the guideway 63 and guide 66 while being sufficiently flexible so as to form the bowed portion 72 easily and be easily rolled up on the reel 64.

Figure 10:
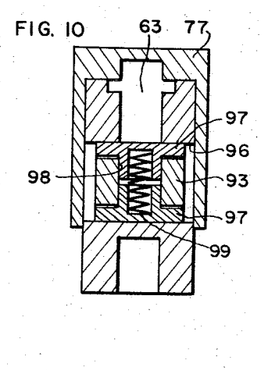

A feeder finger or pawl 91 (FIG. 8) mounted pivotally on pin 92 carried by slide 93 forms a ratchet mechanism therewith. The pawl has a finger or tooth 94 and a splining finger 95. The tooth 94 is adapted to engage the body 82 of each stud 21 and push the studs and the tape 23 along the guideway 63 and guide 66, the tape fitting slidably in the wider portion of the T-shaped guideway 63 and the bodies 82 projecting into the narrower portion of the guideway 63. The slide 93 has a slot 90 (FIG. 9) in which the pawl is mounted pivotally, and is mounted slidably in a guide slot 96 in the plate 57. The guide slot 96 extends along the guideway 63. The guideway 63 extends to the top of the guide slot 96. A pair of cupped, cylindrical brakes 97 (FIGS. 8 and 10) slidable in bore 98 in the end of the slide 93 are urged into contact with the sides of the guide slot 96 by a compression spring 99, and prevent movement of the slide when a force is applied to the pawl 91 while the pawl is free to pivot with the force. However, when pivoting of the pawl is prevented, as when projection 100 of the pawl engages stop 101 of the slide or when the pawl is pulled by a lever 102 having a cam follower 103, and is swung clockwise as viewed in FIG. 8 until portion 104 of the pawl engages the top of the stop 101, and movement of the lever 102 is continued, the slide is moved along the guide slot. That is, when the lever 102 is pivoted, it first swings the pawl against the stop 101 and, on continued application of force to the lever, moves the pawl and slide along the guide slot. The lever 102 is mounted on pin 105 carried by the clevis 59 and has a rounded end 106 projecting into slot or socket 107 in the pawl.

During the initial portion of movement of the gun 24 (FIG. 6) toward the workpiece 21, a cam portion 112 of a cam track 113 engaging the follower 103 first swings the teeth 94 and 95 of the pawl up behind two studs 21 without moving the slide 93 and then pushes the pawl and the slide in a feed direction to push the foremost stud laterally into the welding position before an electrode collet 114 carried by a spindle 115 of the welding gun arrives at the welding position. Just as the foremost stud arrives at the welding position, the cam follower 103 moves out of engagement with the cam portion 112 of the cam track 113 and into a second portion 116 of the cam track. The second portion 116 of the cam track is slightly inclined to the plunger 33, and, on continued forward movement of the cam track, swings the pawl away from the studs to permit the tape and studs to float to facilitate movement of the collet over the stud in the welding position. In this retracted or inoperative position of the pawl, the finger 95 remains in the guideway 63 along with portion 117 to spline the slide to the plate 40.

Figure 13:
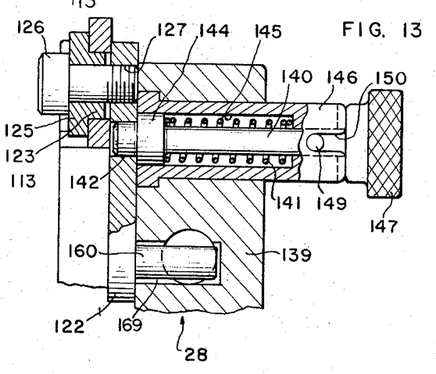
FIG. 13 is an enlarged, vertical sectional view taken along line 13—13 of FIG. 11.
Figure 15:
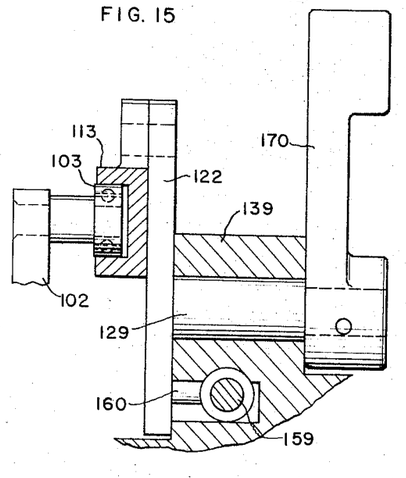
FIG. 15 is an enlarged, fragmentary, vertical sectional view of a portion of the apparatus of FIG. 1.

The cam track 113 (FIGS. 6 and 11) is mounted pivotally on a pin 121 fixed to a plate 122. An eccentric bushing 123 (FIG. 13) has flats 124 on a head 125 thereof for engagement by a wrench, and is mounted eccentrically on a clamping screw 126 screwed into a tapped bore 127 in the plate 122. The screw 126 may be loosened to permit turning the eccentric bushing, which fits into forked end 128 of the cam track, to adjust the cam track to a desired position to determine the length of the stroke of the pawl 91. The plate 122 is mounted pivotally by a pin 129 fixed thereto and journaled in a bore 130 in a mounting plate 139 of the frame 28. For automatic feeding of the tape 23 and studs 21 each time the gun 24 is moved toward the workpiece, the plate 122 is locked relative to the mounting plate 139 by a latching pin 140 (FIG. 13) urged by spring 141 into hole 142 in the plate 122.

Figures 7, 14:
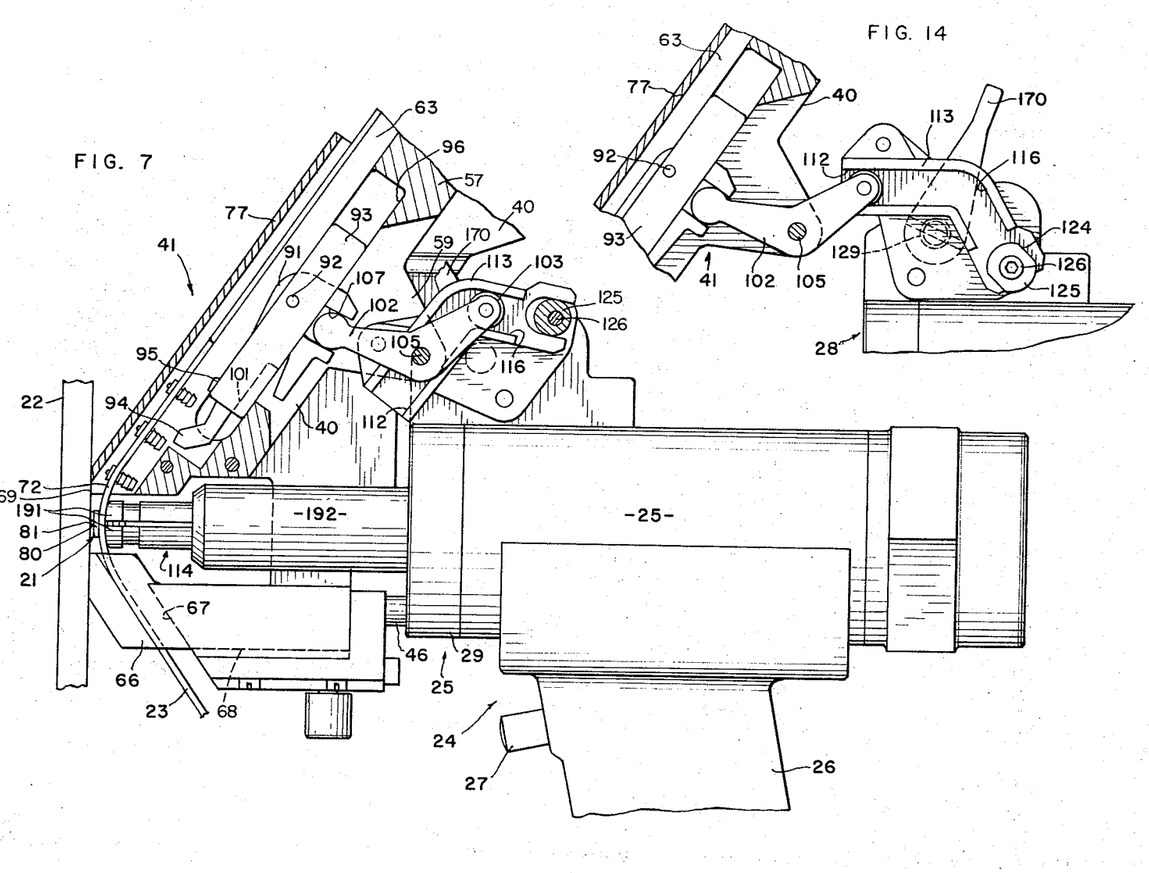
FIG. 14 is an enlarged, fragmentary, vertical sectional view similar to FIG. 7 but with parts thereof in condition for manually feeding studs.

The pin 140 has collar portion 144 slidable in counterbore 145 in annular member or sleeve 146 fixed to the plate 139, and the pin 140 has a knob 147 for pulling the pin out of the hole 142. For only manual operation of the stud-feeding device 41, the pin 140 is pulled manually out of the hole 142, which action pulls a latchout pin 149 out of slot 150 in the sleeve 146. This frees the plate 122 for pivotal movement relative to the mounting plate 139 and the latching pin 140 is turned in the sleeve 146 to a position in which latchout pin 149 is prevented from entering the slot 150. This locks the latching pin in a retracted, inoperative position. A compression spring 156 (FIGS. 11 and 12) seated between a spring seat of a stop plug 157 fixed on the mounting plate 139 and a spring seat 158 on a plunger 159 bearing against pin 160 fixed to plate 122 pivots the plate 122 to a manual position engaging a stop plug 161 on the mounting plate 139, an arcuate slot 169 in the frame 28 providing clearance for the movement of the pin 160. In this position of the plate 122, the cam portion 112 of the cam track 113 is in a dwell position parallel to the plunger 33, as shown in FIG. 14. Movement of the cam track with the welding gun 24 toward and away from the workpiece 22 now does not move the pawl 91 at all. However, when a handle 170 pinned to the pin 129, which is rigid on the plate 122, is pushed manually counterclockwise, as viewed in FIG. 14, it moves the plate 122 in the same direction against the action of the spring 156 (FIG. 12) until the plunger 159 engages stop plug 157. The first portion of this movement of the plate 122 and the cam track 113 therewith swings the pawl 91 out of engagement with the studs 21, and the remaining movement retracts the pawl relative to the studs. The handle 170 then is released and the spring 156 returns the plate 122 and cam track 133 back to their original positions. As the cam track is so returned it first swings the tooth 94 of the pawl 91 into position behind the adjacent studs and then causes the pawl to push the studs and tape along the guideway 63 to position the foremost stud in the welding position. It will be understood that the above manual feeding of the studs is effected while the gun 24 is in its retracted position relative to the work feeding device 41. The handle 170 may be moved slightly to move the pawl tooth 94 to its retracted position at any time it is desired to permit the studs and the tape to float when the collet 114 is moved onto the stud.

The electrode collet 114 (FIGS. 6 and 7) is electroconductive, has spring fingers 191 adapted to slide over and electrically contact the body 82 of any of the studs 21 in the welding position, and is carried by the electroconductive, flanged spindle 192 slidable in flanged guide bushing 193 fixed in the insert portion 66. A compression spring 194 seated between the bottom of counterbore 195 in the spindle 115 and annular member 196 fixed in the housing 25 urges the spindle forwardly relative to the housing and frame 28. An adjustment screw 197 fixed to the member 196 by flanged bushing 198 normally does not engage the end of rod 199 fixed to the collet and spindle and the force of the spring 194 is ordinarily sufficient to push the collet over the body 82 of a stud 21 in the welding position. However, if the collet and the stud bind to keep the collet from moving fully onto the body of the stud, the screw 197 positively engages the end of the rod 199 and pushes the collet onto the body of the stud fully to insure good mechanical gripping and electrical contact.

During the welding proper, the switch 27 is closed to discharge a charged capacitor 201 (FIG. 1) through the collet 114, the stud 21 in the welding position and the workpiece 22. The current melts the tip 80 of the stud to draw an arc and then melts adjacent portions of the stud and workpiece as the spring-pressed collet forces the stud against the workpiece. When the capacitor has fully discharged and the weld has quickly cooled, the welding gun is pulled away from the stud and workpiece, the collet first being slid off the stud, and is returned to its retracted position. The tape 23 then is pulled off the body of the welded stud to free the tape for the next welding operation. A known charging circuit 202 charges the capacitor 201 after discharge thereof.

As best shown in FIG. 16, the reel 64, which is similar to an 8 mm. motion picture projector reel, is mounted on reel spindle 210 having a ball detent retainer 211. A keying pin 212 fixed to collar 213 of the spindle 210 projects into one flange of the reel to key the reel to the spindle. The spindle 210 is journaled in bore 214 and is braked by fibre washers 215 and 216 pressed against the bottoms of counterbores or sockets 217 and 218 by a cupped, spring washer 219 pressing against steel washer 220. The spindle has keying flats 221 and the washers 215 and 220 are formed complementary thereto to key the washers 215 and 220 to the spindle.

In automatic operation of the above-described apparatus, the feeding device 41 is placed against the workpiece as shown in FIG. 6, and the welding gun 25 is pushed toward the workpiece. During the initial movement of the gun and the frame 28, the cam track 113 swings the lever 102 counterclockwise and the lever 102 swings the pawl 91 clockwise to pushing position and then moves the pawl 91 and the studs 21 and tape 23 along the guideway 63 and the tape along guide 66 a distance equal to the distance between centers of adjacent ones of the studs along the tape. This positions the foremost stud 21 in the welding position in which the stud is aligned with the collet 114. Then, on continued forward movement of the gun 24, the second portion 116 of the cam track 113 engages the follower 103 and swings the lever 102 sufficiently to move the pawl finger to its inoperative position freeing the studs and tape. Then, on continued forward movement of the gun 24, the collet 114 is pressed onto the body 82 of the stud in the welding position to the position of the collet shown in FIG. 7. Normally this is effected by only the action of the spring 194 but is done by the sequential action of the adjustment screw 197 and the spring 194 if the collet hangs or binds on the stud, the collet having, of course, a tapered entrance portion. The operator then actuates switch 27 to supply welding current to the stud and the workpiece 22. The welding current first melts the tip 80 of the stud which draws an arc and then the spring-pressed collet pushes the base 81 against the workpiece and the entire end of the base is melted and welded to the workpiece. Then after the weld is cooled, the operator pulls the gun away from the welded stud and the workpiece, which first pulls the collet off the stud, then separates the gun and the device 41, during which movement the tooth 94 of the pawl 91 is sequentially swung back into alignment with the studs, is swung back away from the studs and is moved back along the tape, and then the tape is pulled off the body 82 of the welded stud, the guideway 63 and guide 66 pulling the tape laterally to pull it off the stud, the tape being sufficiently stiff that it is not pulled along the guideway 63 or guide 66 as it is pulled off the stud. The operation described above then may be repeated to weld the next stud.

Figure 11:
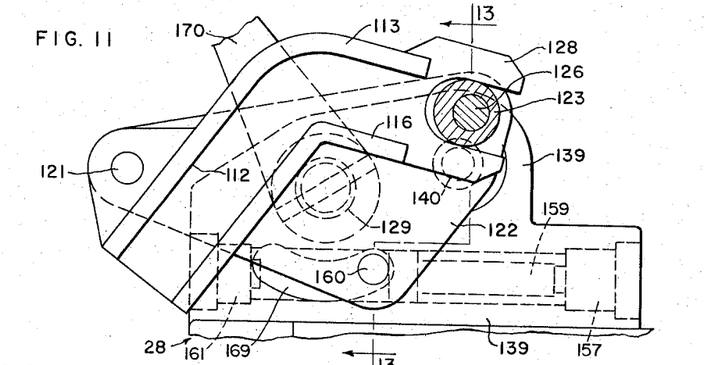
FIG. 11 is an enlarged, fragmentary, partially sectional, side elevation view of the apparatus of FIG. 1.
Figure 12:
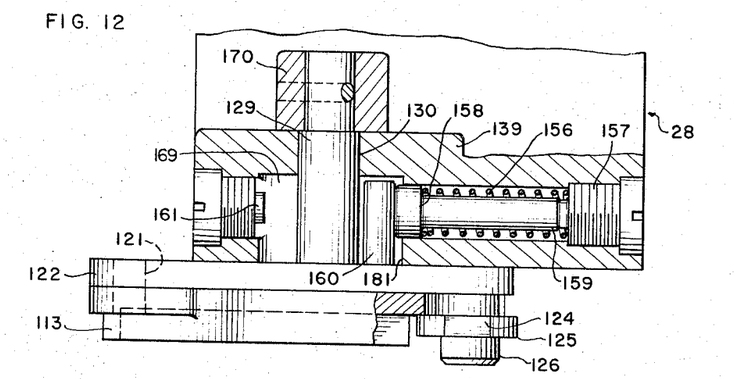
FIG. 12 is an enlarged, fragmentary, top plan view of the portion of the apparatus shown in FIG. 11.

In manual operation, the latching pin 140 (FIG. 13) is pulled to its releasing position and turned to its latched out position, and the spring 156 pushes the plate 122 and cam track clockwise from their positions shown in FIG. 11 to their positions shown in FIG. 14. This feeds the foremost stud to the welding position. After this stud is welded after moving the collet 114 thereover, and the tape is stripped from the welded stud, the operator feeds the next stud to the welding position by swinging the handle 170 counterclockwise as viewed in FIG. 14 as far as permitted to retract the pawl 91 and cock the spring 156 (FIG. 12) and then releases the handle 170. The spring 156 then swings the plate 122 and cam track 113 in a feed stroke to advance the foremost stud to the welding position. The welding then may be effected as described above. To again set the plate 122 in automatic position, the handle 170 is moved so as to cock the spring 156 and the latching pin 140 is turned to a position permitting the spring 141 to move it to latching position.

The bowed portion 73 of the tape 23 in the opening 65 permits the overall length of the work-engaging portions 69 (FIG. 6) to be quite short so that little space on the workpiece 22 is required to weld a stud thereto. The bow in the tape also positions the tip 80 and collar 81 of the stud 21 next to the stud in the welding position back relative to the tip 80 and collar 81 of the stud in the welding position sufficiently that the collar 81 of the stud in the welding position shields the collar 81 of the stud next to the stud in the welding position from any splash occurring during the initial portion of the welding operation proper in which the tip 80 of the stud in the welding position is melted and splash occurs. Where the tape is used to hold welding studs each having a reduced tip corresponding to the tips 80 but no enlarged collars corresponding to the collars 81, the tip end of the body of the stud being welded serves to shield the tip end of the body of the next succeeding stud from splash to prevent any bridging deposits thereon.

The body 82 of each stud 21 is held tightly in its very close fitting hole in the tape 23 until the weld has occurred. When the weld occurs, the portion of the stud being welded which is in contact with the tape is momentarily heated and heats the portion of the tape surrounding the stud to melt this portion of the plastic tape, thereby enlarging the hole greatly so that the tape is easily slid off the stud as the apparatus is pulled away from the workpiece 22 and the welded stud. Thus, ease of withdrawal of the welding apparatus and no pull on the freshly welded stud are provided.

The above apparatus feeds and welds studs and does so without jamming. The feed device 41 is light in weight, compact and simple. It requires a minimum of maintenance. The feed mechanism may be driven either automatically or manually and is readily adaptable to existing welders. While the feed mechanism is shown in use with the welding gun 24 which is of the "initial contact" type, the feed mechanism can obviously be used with guns of the "initial gap" type.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In combination,
a guideway for holding a supply of studs including means engaging a workpiece,
ratchet means for moving studs along the guideway seriatim to a welding position,
stud-engaging electrode means,
means mounting the stud-engaging electrode means in alignment with a stud in the welding position and permitting movement of the electrode means between a retracted position out of engagement with the last-mentioned stud and a second position in engagement with the last-mentioned stud,
and means responsive to the movement of the stud-engaging electrode means from the retracted position and operable during the initial portion of the movement toward the second position for actuating the ratchet means to feed a stud to said welding position.

2. In combination,
a guideway,
feed means including a carrier tape having a supply of studs therein for advancing studs seriatim along the guideway to a work position at one end of the guideway,
holding means including the carrier tape at said one end of the guideway for engaging a workpiece and holding in the working position each stud advanced to the work position,
collet means movable from a retracted position spaced from the work position to a forward position gripping a stud in the work position and back to the retracted position,
and drive means actuated by the initial portion of movement of the collet means from the retracted position thereof to said forward position for operating the feed means to advance a stud to the work position prior to movement of the collet means into gripping engagement with the stud.

3. In combination,
a tubular gun housing,
a collet,
frame means carried by the housing and mounting the collet in a position spaced forwardly of the housing,
a plunger mounted telescopically on the frame means in a position parallel to the housing,
means urging the plunger forwardly of the housing,
adjustable means limiting forward movement of the plunger,
a stud-feeding device including a carrier tape and carried on the forward end of the plunger,
follower means carried by the stud feeding device,
a cam track mounted on the frame means for engaging the follower means to drive the stud-feeding device upon collapsing movement of the plunger rearwardly relative to the housing,
and means for adjusting the cam on the frame means to vary the movement of the follower means.

4. In combination,
a tape carrying a plurality of studs at spaced points therealong,
a guideway for guiding the tape and having an opening intermediate the ends thereof through which a stud can be moved out of the tape,
electrode means movable toward the opening for moving into engagement with a stud positioned in the opening during the latter portion of such movement for welding the last-mentioned stud to a workpiece and movable away from the opening,
and means responsive to the movement of said electrode means operable during the initial portion of the movement of the electrode means toward the opening for advancing the tape to move a stud to the opening and into alignment with the electrode means.

5. In combination,
a perforated tape carrying a plurality of studs at spaced points therealong,
locating means for engaging a workpiece,
a guideway guiding the tape to position a stud in a welding position relative to the workpiece,
an electrode collet for engaging a stud in the welding position,
means urging the collet to a retracted position retracted from a stud in the welding position and permitting movement of the collet forwardly relative to the locating means to a second position gripping a stud in the welding position,
feed means for advancing the tape along the guideway,
and means operable by movement of the collet from its second position toward said locating means for driving the feed means.

6. In combination,
a perforated tape carrying a plurality of studs at spaced points therealong,
frame means having a forward portion,
locating means for engaging a workpiece and carried movably by the frame means and urged toward a position projecting a predetermined distance beyond the frame means and movable back toward the frame means,
a guideway guiding the tape between the frame means and a workpiece and normally spaced from the frame means in a welding position relative to the workpiece,
an electrode collet carried by the frame means for engaging a stud in the welding position,
means urging the frame means and the collet to a retracted position of the collet spaced from the locating means and permitting movement of the frame means and the collet forwardly relative to the locating means to a second position of the collet in which the collet grips a stud in the welding position,
feed means for advancing the tape along the guideway,
and means operable by and during the initial portion of the movement of the frame means toward the workpiece for driving the feed means.

7. In a welding gun,
housing means,
a tape guideway for engaging a workpiece,
a tape slidable along the guideway and holding studs at points spaced therealong,
means mounting the guideway in a position spaced forwardly of the housing means in which the tape extends across the projected area of the housing means and urging the housing means to a retracted position spaced away from the tape and permitting movement of the housing means to a forward position adjacent the tape,
collet means movable by the housing means from a retracted position spaced from a stud carried by the tape to a welding position engaging the stud,
ratchet means mounted movably on the guideway for moving the tape along the guideway,
lever means carried by the guideway for driving the ratchet means,
a cam follower carried on one end of the lever means,
and a cam track having a driving portion and a pawl-retracting portion and mounted on the housing means in engagement with the cam follower in a position in which the driving portion moves the cam follower to move the lever to move the ratchet means in a feed stroke during only the initial portion of the movement of the barrel means toward its forward position and the pawl-retracting portion engages the follower means for the remaining portion of the movement of the housing means toward its forward position.

8. In a welding gun,
housing means,
a tape guideway for engaging a workpiece,
a tape slidable along the guideway and holding studs at points spaced therealong,
means mounting the guideway in a position spaced forwardly of the housing means in which the tape extends across the projected area of the housing means and urging the housing means to a retracted position spaced away from the tape and permitting movement of the housing means to a forward position adjacent the tape,
collet means movable by the housing means from a retracted position spaced from a stud carried by the tape to a welding position engaging the stud,
ratchet means mounted movably on the guideway for moving the tape along the guideway,
lever means carried by the guideway for driving the ratchet means,
a cam follower carried on one end of the lever means,
a cam track mounted movably on the housing means in engagement with the cam follower and having a driving portion,
releasable means for locking the cam track against movement relative to the housing means in a first position in which the driving portion moves the cam follower to move the lever to move the ratchet means in a feed stroke during only the initial portion of the movement of the housing means toward its forward position,
spring means operable when the releasable means is actuated to release the cam track for urging the cam track from the first position to a second position in which the driving portion of the cam track engages the cam follower and is in a position of dwell,
and manually operable means for moving the cam track from the second position thereof against the spring means to actuate the lever to actuate the ratchet means.

9. In a welding gun,
housing means,
holding means for guiding and holding studs and engaging a workpiece,
means mounting the holding means in a position spaced forwardly of the housing means in which the holding means holds a stud in the projected area of the housing means and urging the housing means to a retracted position spaced away from the holding means and permitting movement of the housing means to a forward position adjacent the holding means,
collet means movable by the housing means from a retracted position spaced from a stud held by the holding means to a welding position engaging the stud,
ratchet means mounted movably on the holding means for moving studs along the holding means,
lever means carried by the holding means for driving the ratchet means,
a cam follower carried on one end of the lever means,
and a cam track having a driving portion and a second portion and mounted movably on the barrel means in engagement with the cam follower in a first position in which the driving portion moves the cam follower to move the lever to move the ratchet means in a feed stroke during only the initial portion of the movement of the housing means toward its forward position and the second portion engages the follower means for the remaining portion of the movement of the housing means toward its forward portion and moves the ratchet means out of engagement with the studs.

10. In an attachment for a welding gun having a housing,
frame means attachable rigidly to the housing of the welding gun,
a tape guide,
a tape carrying studs and guided by the tape guide,
means mounting the guide for movement toward and away from the frame means,
means urging the guide away from the frame means,
cam means carried by the frame means,
and cam follower means carried by the tape guide and operable by the cam means to advance the tape along the tape guide upon movement of the tape guide toward the frame means.

11. In a stud-feeding attachment for a welding gun,
magazine means for feeding studs seriatim to a position in alignment with the housing of such a gun,
cam means,
frame means carrying the cam means and normally mounting the cam means rigidly on the housing and means actuable to release the cam means for movement relative to the frame means,
means mounting the magazine means on the frame means for movement longitudinally of the housing toward and away from the frame means and urging the magazine means away from the frame means,
cam follower means normally operable by the cam means when the frame means is moved relative to the magazine means,
and means for operating the cam means manually when the frame means is actuated to release the cam means.

12. In a welding gun,
a tape for carrying studs at spaced points therealong in positions projecting from opposite faces of the tape,
guide means for engaging a workpiece and guiding the tape along a path in which each stud at one point along the path is positioned near a workpiece engaged by the guide means,
electrode means movable relative to the guide means for engaging a stud at said one point for pressing the stud against the workpiece,
means urging the electrode means away from the guide means, and means actuated by movement of the electrode means toward the guide means for advancing the tape to locate a stud at said one point before the arrival of the electrode means into position to engage the stud.

13. In a welding apparatus,
feeding means including a carrier tape for feeding studs,
actuator means including a follower means and operable to drive the feeding means to advance the tape in accordance with the extent of movement of the follower means,
a welding gun movable toward and away from the feeding means,
a mounting member movable with the gun,
a cam mounted on the mounting member and engaging the follower means to drive the follower means when the gun is moved toward the feeding means and before the gun engages a stud,
and means for adjusting the cam on the member to vary the extent of movement of the follower means.

14. In a welding apparatus,
a tape of thermoplastic material having a plurality of holes therethrough carrying studs having bodies fitting tightly in the holes, enlarged collar portions positioned at one side of the tape and reduced tips projecting from the collar portions,
tape-guiding means having spaced, angularly directed portions adapted to bow toward a workpiece the portion of the tape positioned in the space between the angularly directed portions and position succeeding studs out of the path of splash from a stud carried by the last mentioned portion of the tape,
and means for supplying a welding current to a workpiece and a stud held in a welding position adjacent the workpiece by the portion of the tape in the space between the angularly directed portions of the tape-guiding means to weld the last-mentioned stud to the workpiece and momentarily heat the last-mentioned stud sufficiently to melt the portion of the tape around the hole in which the last-mentioned stud is positioned to enlarge the last-mentioned hole sufficiently to free the last-mentioned stud from the tape.

15. The combination of claim 2 including
a housing for said collet,
a spring means operatively arranged with said collet to urge the same from said housing toward said forward position,
and stop means in said housing for engaging the collet when the collet is pushed back into the housing a predetermined amount.

References Cited by the Examiner

UNITED STATES PATENTS

| | | | |
|---|---|---|---|
| 963,170 | 7/1910 | Parker | 221—211 |
| 1,410,560 | 3/1922 | Latham | 221—72 X |
| 1,505,152 | 8/1924 | Latham | 221—72 X |
| 1,982,098 | 11/1934 | Hartman | 219—98 X |
| 2,510,620 | 6/1950 | Craven | 219—98 |
| 2,537,989 | 1/1951 | Graham | 219—78 |
| 2,622,179 | 12/1952 | Butterfield | 219—98 |

FOREIGN PATENTS 806,526　12/1958　Great Britain.

ANTHONY BARTIS, *Primary Examiner.*

RICHARD M. WOOD, *Examiner.*

R. F. STAUBLY, *Assistant Examiner.*